US008676750B2

(12) United States Patent
Bitar et al.

(10) Patent No.: US 8,676,750 B2
(45) Date of Patent: Mar. 18, 2014

(54) EFFICIENT DATA SYNCHRONIZATION IN A DISTRIBUTED DATA RECOVERY SYSTEM (75) Inventors: Akram Bitar, Haifa (IL); Olympia Gluck, Haifa (IL); Amir Sasson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/710,096

(22) Filed: Feb. 22, 2010

(65) Prior Publication Data

US 2011/0208694 A1 Aug. 25, 2011

(51) Int. Cl.
*G06F 17/30* (2006.01)

(52) U.S. Cl.
USPC ............................................ 707/610; 707/617

(58) Field of Classification Search
USPC .......................................... 707/610, 675, 617
See application file for complete search history.

(56) References Cited

U.S. PATENT DOCUMENTS

| 7,047,378 | B2 | 5/2006 | Factor et al. |
| 7,412,464 | B2 | 8/2008 | Fienblit et al. |
| 7,831,550 | B1 * | 11/2010 | Pande et al. .................. 707/610 |
| 2006/0026460 | A1 | 2/2006 | Goldberg et al. |
| 2006/0168415 | A1 * | 7/2006 | Ishii et al. ..................... 711/165 |
| 2008/0098187 | A1 * | 4/2008 | Ashour et al. ................ 711/162 |
| 2008/0301494 | A1 | 12/2008 | Butterworth et al. |
| 2009/0070528 | A1 | 3/2009 | Bartfai et al. |

* cited by examiner

*Primary Examiner* — Etienne Leroux
*Assistant Examiner* — Fariborz Khoshnoodi
(74) *Attorney, Agent, or Firm* — Griffiths & Seaton PLLC (57) ABSTRACT A method for synchronizing data stored on primary and secondary storage volumes in a distributed data recovery system is provided. The method comprises associating N data recovery relationships between a primary volume and N secondary volumes by way of implementing N data structures respectively. Each data structure comprises a first indicator that indicates whether data stored on a first track of the primary volume has been updated, due to a first operation performed by a host application. One or more of the N data structures are stored in at least a first data storage medium with high speed data access rates.

20 Claims, 8 Drawing Sheets

Operating Environment 100

| BITS | 0-9 | 1 | 11-19 | 2 | 21-29 | 3 | 31-39 | 4 | ... |
|---|---|---|---|---|---|---|---|---|---|
| BITMAPS | | 0 | | 0 | | 0 | | 0 | |
| BITMAP 1 | 0000000000 | 1 | 0000000000 | 1 | 0000000000 | 1 | 0000000000 | 0 | 0000000000 |
| BITMAP 2 | 0000000000 | 0 | 0000000000 | 0 | 0000000000 | 0 | 0000000000 | 0 | 0000000000 |
| .... | 0000000000 | 0 | 0000000000 | 0 | 0000000000 | 0 | 0000000000 | 0 | 0000000000 |
| BITMAP N | 0000000000 | 0 | 0000000000 | 0 | 0000000000 | 0 | 0000000000 | 0 | 0000000000 |
| PRIMARY BITMAP | 0000000000 | 1 | 0000000000 | 1 | 0000000000 | 1 | 0000000000 | 0 | 0000000000 |

*FIG. 3C*

| BITS | 0-9 | 1 | 11-19 | 2 | 21-29 | 3 | 31-39 | 4 | .... |
|---|---|---|---|---|---|---|---|---|---|
| BITMAPS | | | | | | | | | |
| BITMAP 1 | 0000000000 | 0 | 0000000000 | 0 | 0000000000 | 0 | 0000000000 | 0 | 0000000000 |
| BITMAP 2 | 0000000000 | 0 | 0000000000 | 0 | 0000000000 | 0 | 0000000000 | 0 | 0000000000 |
| .... | 0000000000 | 0 | 0000000000 | 0 | 0000000000 | 0 | 0000000000 | 0 | 0000000000 |
| BITMAP N | 0000000000 | 0 | 0000000000 | 0 | 0000000000 | 0 | 0000000000 | 0 | 0000000000 |
| PRIMARY BITMAP | 0000000000 | 0 | 0000000000 | 0 | 0000000000 | 0 | 0000000000 | 0 | 0000000000 |

EFFICIENT DATA SYNCHRONIZATION IN A DISTRIBUTED DATA RECOVERY SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to distributed data recovery systems and, more particularly, to a system and method for efficient data synchronization.

In a distributed data recovery network, data recovery relationships may be established between several storage mediums to allow for redundant copying of data from a primary storage volume to several secondary storage volumes for backup purposes. Advantageously, even if a backup copy stored on one of the secondary storage volumes is unavailable, copies stored on the other secondary storage volumes may be used to restore data to the primary storage volume.

For consistency, data is synchronized between the primary and the secondary volumes at predetermined time intervals or upon occurrence of one or more conditions. Accordingly, when data on a track of the primary volume is updated, the respective tracks on the secondary volumes are also updated during each synchronization. If a large number of secondary volumes are utilized, then the synchronization process may take a relatively long time and an undesirable lag in processing may result.

SUMMARY

For purposes of summarizing, certain aspects, advantages, and novel features of the claimed subject matter have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for synchronizing data stored on primary and secondary storage volumes in a distributed data recovery system. The method comprises associating N data recovery relationships between a primary volume and N secondary volumes by way of implementing N data structures respectively. Each data structure comprises a first indicator that indicates whether data stored on a first track of the primary volume has been updated, due to a first operation performed by a host application. One or more of said N data structures are stored in at least a first data storage medium with high speed data access rates.

The primary data structure may be implemented to comprise a second indicator for indicating that data stored on the first track of the primary volume has been updated, in response to detecting that the first indicator in at least one of the N data structures is set to a first value. An acknowledgment is provided to the host that at least one of the N data structures reflects the updated status of the data stored in the first track of the primary volume, so that the host continues to perform a second operation.

The value of the second indicator in the primary data structure may be updated to indicate that data stored on the first track of the primary volume has been successfully copied to M secondary volumes, in response to detecting that the first indicator in at least M of the N data structures is set to a second value. The primary data structure is stored on at least one non-volatile data storage medium. The first data storage medium comprises at least one of random access memory, flash memory, or a solid state memory device.

In one embodiment, the non-volatile data storage medium comprises at least one of a hard disk drive, a CD ROM, or a solid state memory device. The primary volume is locally coupled to a computing system over which the host application is executed; and one or more of the N secondary volumes are remotely coupled to a computing system over which the host application is executed.

In accordance with one aspect of the claimed subject matter, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
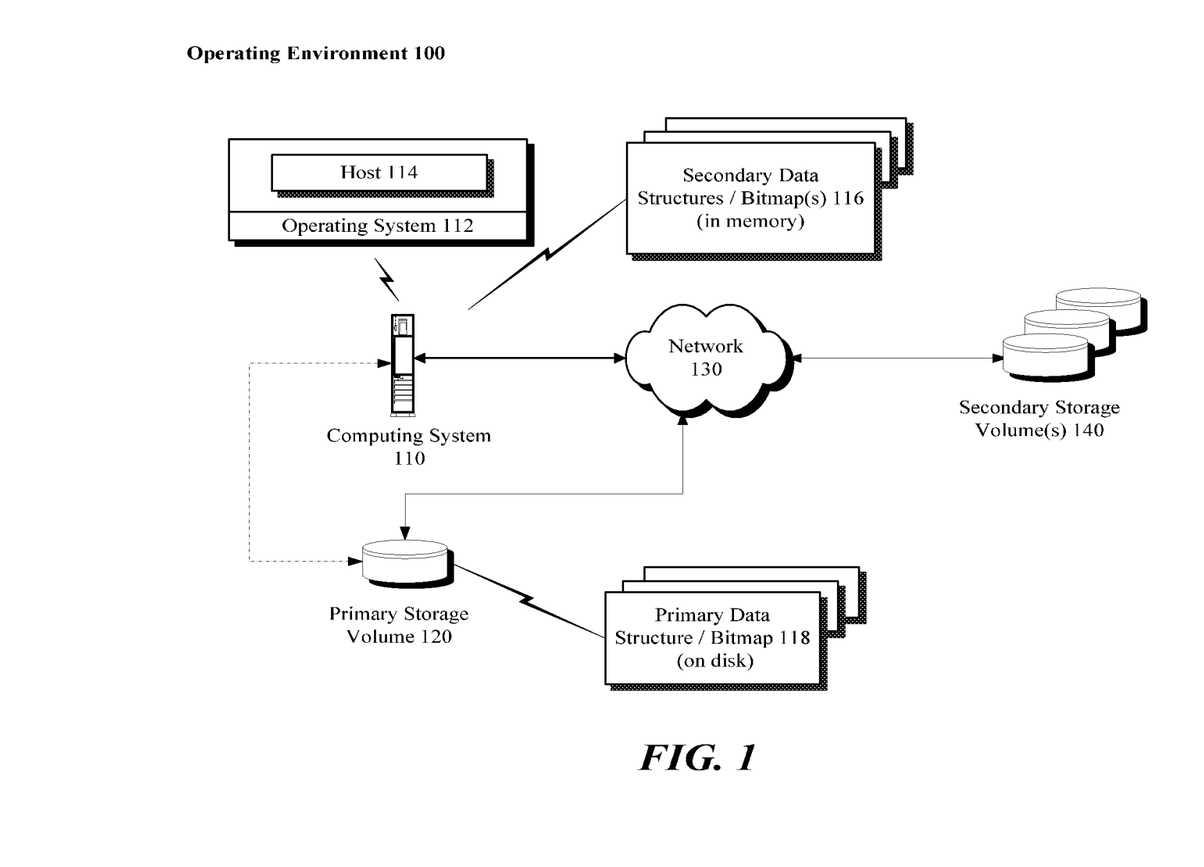
FIG. 1 illustrates an exemplary operating environment in accordance with one or more embodiments of the invention, wherein data stored on a primary storage media is redundantly copied to multiple secondary storage media.

Referring to FIG. 1, an exemplary operating environment 100 is provided in which a primary data source (e.g., a primary storage volume 120) is connected to one or more secondary storage units (e.g., secondary storage volumes 140) in a network 130. As shown, a computing system 110 may be coupled to primary storage volume 120, for example, in a local network. Computing system 110 may be a storage controller, for example. Depending on implementation, secondary storage volumes 140 may be remotely coupled to computing system 110 via network 130. It is noteworthy that in different implementations the primary and secondary storage volumes 120, 140 may be coupled either locally or remotely to each other or computing system 110.

An operating system 112, in one embodiment, is loaded onto computing system 110. Computing system 110 may support a multiprocessing environment in which a host 114 (e.g., a software application) is executed on top of operating system 112. Computing system 110 may comprise or be coupled to one or more storage devices. Without limitation, such storage devices may include one or more volatile or non-volatile storage media such as random access memory, CD ROM, hard disk drives, solid state memory devices, flash memory, etc.

Host 114 may be configured to perform one or more operations (e.g., write, delete, etc.) that result in modification of data stored on primary storage volume 120. In one embodiment, data stored on primary storage volume 120 is redundantly copied over to N secondary storage volumes 140 for the purpose of data recovery. In other words, the redundant copies may be used to restore lost or corrupted data to primary storage volume 120. The added redundancy in the number of copies stored on the secondary storage volumes 140 provides more reliable options for data recovery.

Depending on implementation, synchronous or asynchronous copying schemes may be employed. In a synchronous scheme, the updated data is copied from the primary storage volume 120 to secondary storage volumes 140 desirably after each data update on the primary storage volume 120. In an asynchronous scheme, the data on the secondary storage volumes 140 is updated after a predetermined time delay or according to other conditions (e.g., number of operations performed, etc.) to reduce the load on the system that is present in a synchronous scheme due to the need for constant updating after each operation.

Referring to FIG. 1, one or more data structures (e.g., bitmaps) 116, 118 may be implemented to track the data update on the primary storage volume 120. The data structures 116 and 118 may be stored in storage media supported by a storage controller or a host system. In one exemplary embodiment, one or more bitmaps 116, 118 may be instantiated to indicate whether or not data stored on a track on the primary storage volume 120 has been updated. By way of example, if there are X tracks on the primary storage volume 120, X indicators (e.g., bits) in each bitmap would be respectively associated with each track such that, for example, bit number 10 represents whether or not track 10 has been modified due to a host operation.

Depending on implementation, a set value (e.g., 1) may be assigned to a bit to indicate that a corresponding track has been updated due to a host operation and should be copied to the secondary storage volumes 140. A reset value (e.g. 0) for a bit would indicate that the data on corresponding track is not to be copied to secondary storage volumes 140 because, for example, either the data has not been changed due to a host operation, or if changed, it has been already copied over to the secondary storage volumes 140, as provided in further detail below.

It is noteworthy that the above exemplary bitmaps and value associations for setting or resetting the bits are only exemplary in nature. Other data structures (e.g., linked lists, arrays, tables, B-Trees, etc.) and value setting methods may be utilized to implement the same or similar indexing, mapping or tracking schemes. Accordingly, the exemplary embodiments disclosed here should not be construed as limiting the scope of the claimed subject matter to bitmaps or other specific examples.

Figure 2:
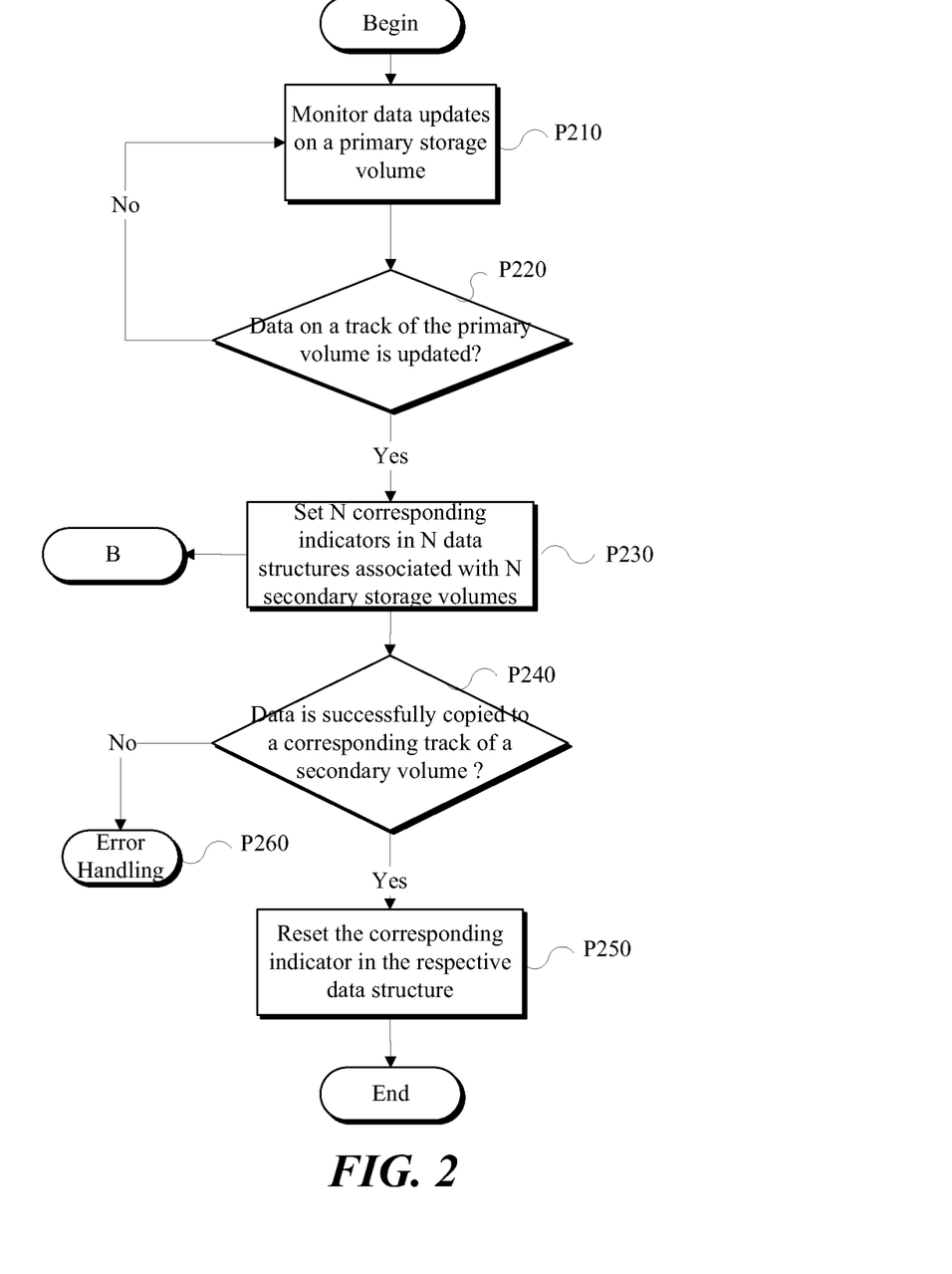
FIG. 2 is a flow diagram of a method for monitoring data updates for a primary storage unit, in accordance with one embodiment.

Referring now to FIGS. 1 and 2, in one or more embodiments, the data recovery network 130 is configured to monitor data updates on a primary storage volume 120 (P210). One or more server systems either individually or collectively may be assigned to perform the monitoring task. By way of example, computing system 110 represents an exemplary processing unit which performs the respective data operations discussed in further detail below. It is noteworthy, however, that said operations in other implementations may be performed individually or collectively by a distributed group of computing systems (not shown) in network 130.

In an exemplary embodiment, host 114 may be executed on computing system 110. An operation performed by host 114 may result in a change in value of data stored on primary storage volume 120. For example, host 114 may write new or additional data to a track of primary storage volume 120. In response to determining that data stored on a track of primary storage volume 120 has been updated (P220), a corresponding indicator (e.g., bit) in N secondary data structures (e.g., N bitmaps 116) associated with N secondary storage volumes 140 is set (P230).

Depending on the level of protection desired, a larger number of bitmaps 116 may be implemented to provide for a relatively higher level of redundancy and therefore a more dependable data recovery environment. In accordance with one embodiment, N bitmaps 116 may be instantiated to correspond with N secondary storage volumes 140. Accordingly, N levels of redundancy will be maintained for data stored on primary storage volume 120. As such, if host 114 writes data to tracks 10, 20 and 30 of the primary storage volume 120, for example, then bits associated with tracks 10, 20 and 30 are set in said N bitmaps 116. Each set bit indicates that data stored on a corresponding track (e.g., tracks 10, 20 and 30) on one or more of the N secondary storage volumes 140 is to be updated during a next synchronization.

Figure 3A:
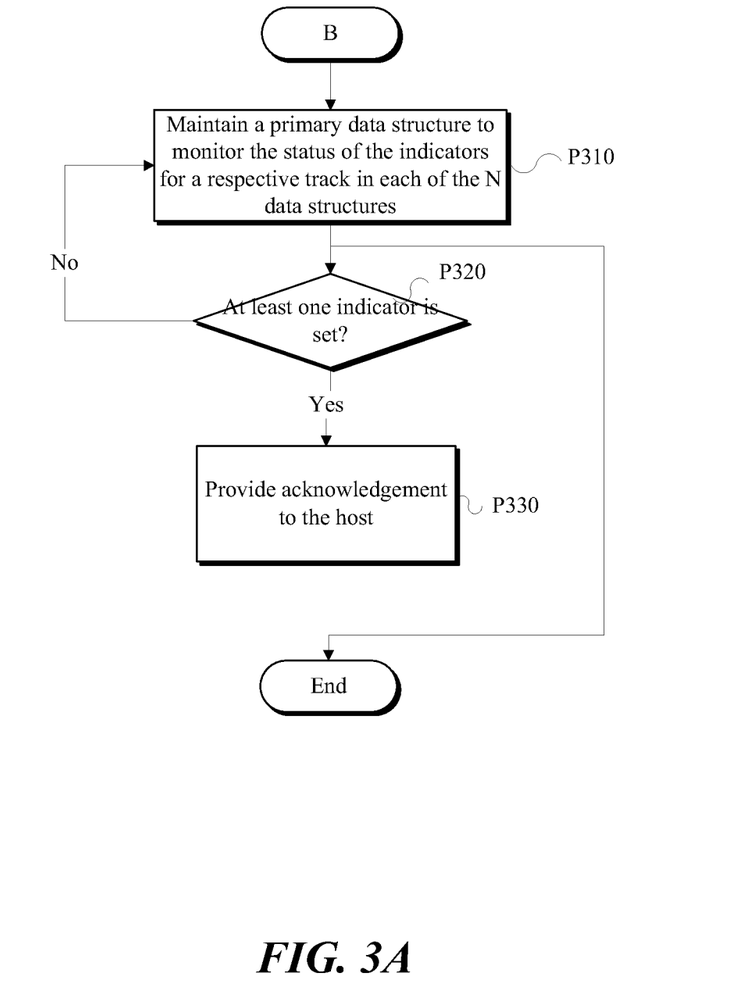
FIGS. 3A and 3B are flow diagrams illustrating exemplary methods for determining successful copying of data from a primary storage to multiple secondary storage units, in accordance with one or more embodiments.

As provided in further detail below with respect to FIGS. 3A and 3B, depending on the synchronization scheme implemented, an acknowledgment may be forwarded to host 114 after the bits in one or more bitmaps 116 are set, so that host 114 can continue to perform others tasks, without waiting for the synchronization between primary storage volume 120 and multiple secondary storage volumes 140 to be performed or completed.

Referring back to FIG. 2, when the proper conditions for synchronizing a secondary storage volume 140 are met, the data on the corresponding track of secondary storage volume 140 is updated to match that of the primary storage volume 120. It is determined whether the data is successfully copied to the corresponding track of secondary volume 140 (P240). If not, an error handling operation is desirably initiated (P260). Otherwise, upon successful updating of the respective tracks of secondary volume 140, the corresponding bits in the respective bitmaps 116 are reset (P250). Desirably, bitmaps 116 are implemented and stored in one more storage mediums with high speed access rates (e.g., random access memory, flash memory, cache, solid state storage devices, etc.) to provide fast access to data stored thereon.

Referring now to FIGS. 1, 2, 3A and 3B, in one embodiment, a primary data structure 118 (e.g., a primary bitmap) is maintained to monitor the status of indicators (e.g., bits) for a respective track in each of the N secondary data structures (e.g., secondary bitmaps 116) (P310). The primary data structure 118 is desirably stored on a non-volatile storage medium (e.g., a hard disk drive, flash memory, a solid state memory device, CD ROM, etc.) for the purpose of reliability. As provided in more detail below, if at least one of the indicators in the primary data structure 118 is set, then an acknowledgement is provided to host 114 so that host 114 can continue performing other operations.

In the following, additional details are provided by referring to the exemplary embodiment disclosed in FIG. 1, without detracting from the scope of the claimed subject matter. Depending on implementation, the value of a bit in bitmap 118 is set based on the collective value of the corresponding bits in N bitmaps 116. That is, if bits 1 through X in bitmap 118 respectively correspond to bits 1 through X in each of the N bitmaps 116, then where at least one of the bits in one of the N bitmaps 116 is set, the respective bit in bitmap 118 is also set.

The above relationship for setting a bit in bitmap 118 based on the collective value of bits in the N bitmaps 116 may be implemented in an exemplary embodiment by adding the values of the corresponding bits in the N bitmaps by way of, for example, a logical OR operation. For instance, if bits 10, and 30 in at least one of the N bitmaps 116 are set, then bits 10, 20 and 30 of bitmap 118 are also set, even if the bits in the other N bitmaps are not yet set.

Figure 3B:
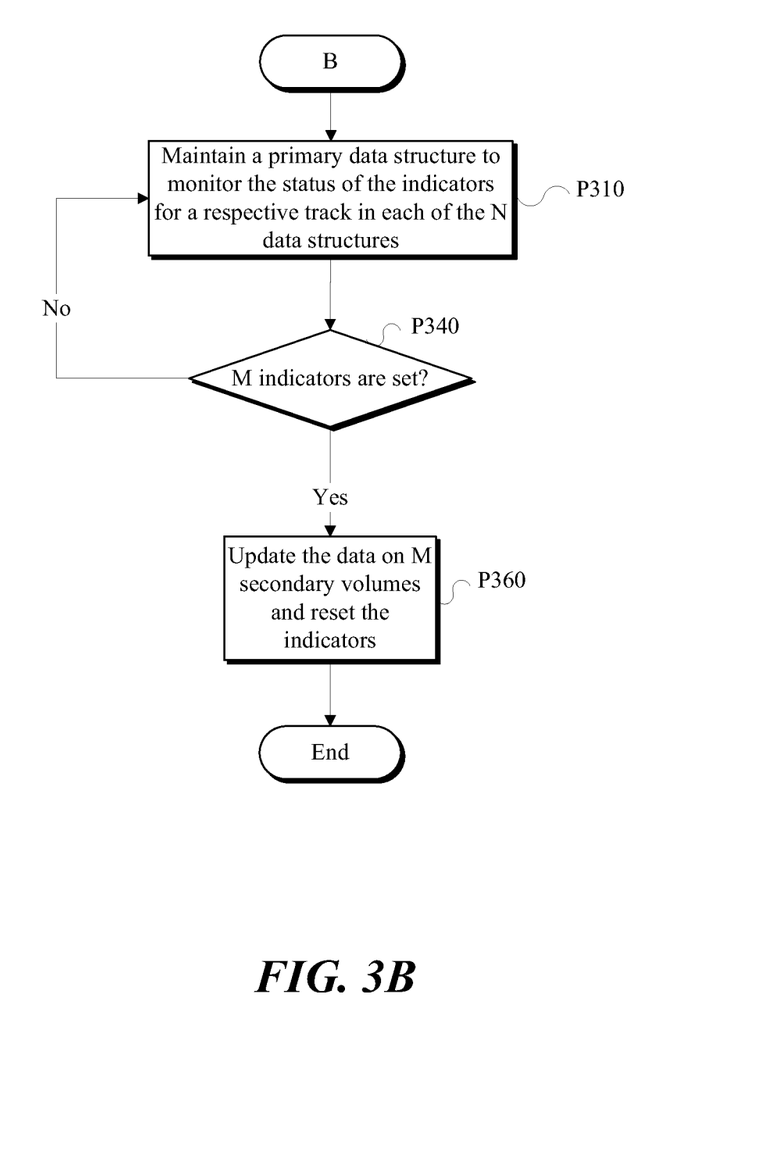
Figure 3C:
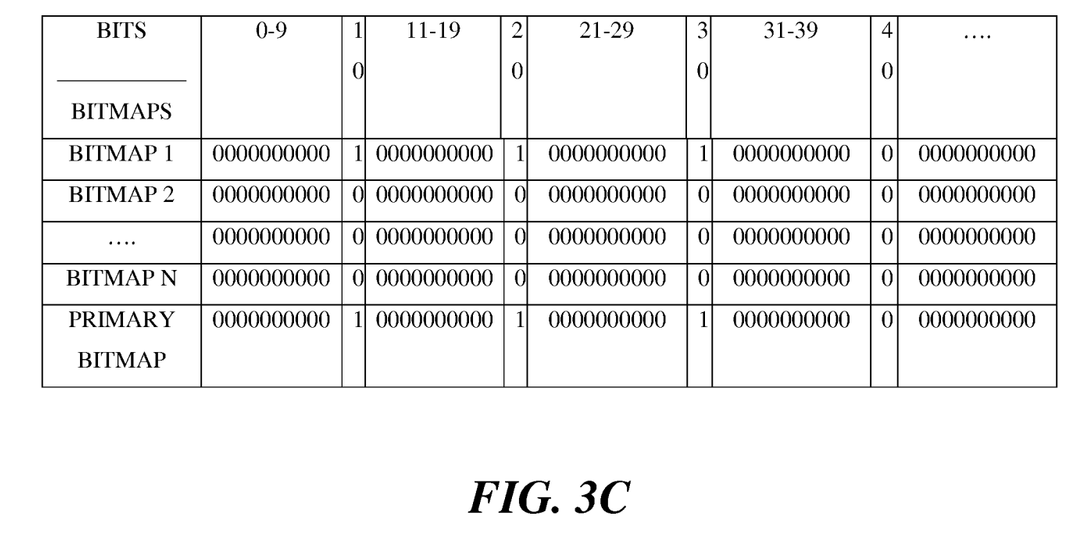
FIGS. 3C and 3D illustrate an exemplary table reflecting the value of indicators in a primary data structure associated with a primary data storage volume before and after data is updated in the corresponding tracks of secondary storage volumes, in accordance with one or more embodiments.

FIG. 3C illustrates an exemplary bitmap 1 (i.e., one of the N bitmaps 116) with set bits 10, 20 and 30. A logical OR operation applied to the bit values of bitmaps 1 through N results in bits 10, 20 and 30 for the primary bitmap 118 to bet set. In such a scenario, evaluating the bits in the primary bitmap 118 will provide an indication that the corresponding bits in at least one of the N bitmaps 116 have been set.

The above bit settings in turn indicate that the tracks on at least one secondary storage volume 140 that correspond to set bits 10, 20 and 30 are to be updated during the next synchronization process. As such, an acknowledgement may be sent to host 114 to indicate that the data updated, due to a host operation on the corresponding tracks on primary storage volume 120, will be copied to at least one secondary storage volume 140.

Advantageously, evaluation of bit values in, for example, a single primary bitmap 118 will allow for an acknowledgement to be provided to host 114, so that host 114 may move on to performing the next operation, instead of waiting to receive multiple acknowledgements from each one of the N secondary storage volumes 140. In other words, the above process eliminates the need for evaluating N secondary bitmaps 116 in favor of evaluating, desirably, a single primary bitmap 118, and thereby increasing the efficiency of the host 114 and the recovery system overall. Further, storing and reading (i.e., staging and destaging) a single primary bitmap 118, instead of storing and reading N secondary bitmaps 116, reduces the response time to the host 114.

Referring to FIG. 3B, in one embodiment, a synchronization process may be initiated by evaluating indicator values in the primary data structure 118 (e.g., a primary bitmap), since the primary data structure 118 monitors the status of the indicators for a respective track in each of the N secondary data structures 116 (e.g., secondary bitmaps). If M data structures out of the N secondary data structures 116 include indicators that are set, then data in M secondary storage volumes 140 associated with said M secondary data structures 116 is updated and the corresponding indicators in each of the M secondary data structures 116 are reset.

Figure 3D:
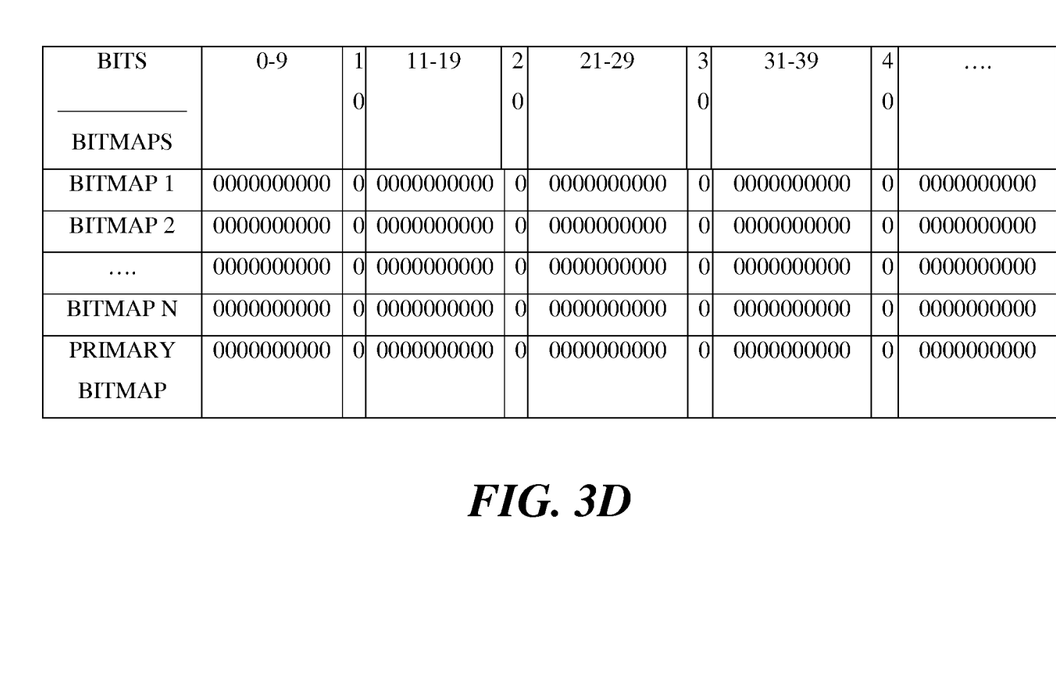

FIG. 3D is an exemplary illustration of a state in which all indicators (e.g., bits) in all secondary data structures 118 (e.g., bitmaps 1 through N) are reset. As a result, all indicators in the primary data structure 118 (e.g., the primary bitmap) are also reset (e.g., due to the OR relationship implementation discussed earlier). In this state, a quick evaluation of the indicators in the primary data structure 118 will provide an indication that there are no tracks on the primary storage volume 120 that are to be copied to secondary storage volumes 140.

The general concepts and procedures discussed above may be applicable in special purpose environments and specific settings. For example, network 130 may be implemented to support a peer to peer remote copy (PPRC) infrastructure. In such an implementation, one primary volume may establish many PPRC relations with multiple secondary volumes. These PPRC relations can be synchronous or asynchronous relations.

Each PPRC relation may maintain a bitmap that tracks changes performed to the primary volume which are not yet sent to the secondary volume. In case of synchronous relations, the bitmap is updated when either the communication to the secondary is broken or the secondary does not receive updates anymore. In case of asynchronous relations, the bitmap is updated on each host write and the updated data is sent to the secondary later. If the transfer fails, the corresponding bit will remain set.

In some embodiments, when the communication between the primary and the secondary volumes is broken, the PPRC relation state will be changed to a suspended state. In the suspended state, the write operations are marked in the bitmap. Once the communication problems are solved a resynchronization process will start copying the corresponding data which has set bits in the bitmap to the secondary.

The bitmap may be referred to as an out of sync (OOS) bitmap and saved in a metadata track in association with the data. In an exemplary PPRC infrastructure, each PPRC relation may be identified by an OOS bitmap. Therefore, each write to the primary volume may update many OOS bitmaps in parallel before returning an acknowledgment to the host for an operation requested by the host. Depending on implementation, OOS bitmaps can be saved in different sectors in the same metadata track or in different metadata tracks, for example.

In one embodiment, an OOS bitmap for each PPRC relation is maintained in memory (e.g., stored in cache) and at least one OOS bitmap is maintained in metadata (e.g., stored on disk). The OOS bitmap in metadata is desirably generated by the application of a logical OR of a subset of the existing in-memory OOS bitmaps. For example, when a host write is presented for an asynchronous PPRC primary volume or PPRC primary volume in the suspended state, the corresponding OOS bitmap is updated in memory.

Before returning the acknowledgement to the host, the in-memory OOS bitmaps are logically ORed atomically with the OOS bitmap in metadata. If updated data stored on a track of the primary volume is sent successfully to one of the target secondary volumes, then the corresponding bit in the in-memory OOS bitmap is reset. The OOS bitmaps are logically ORed either atomically or after a number of updates (or any other criteria) with the OOS bitmap in metadata. Periodically, the OOS metadata will be stored (i.e., hardened) to the disk.

EXAMPLE #1

Assuming the following combination (synchronous and asynchronous) of PPRC relations: $A \text{-->} B_1$, $A \text{--->} B_2$, ... $A \text{-->} B_n$, one OOS bitmap may be defined in memory for every PPRC relation and one ORed OOS bitmap may be defined in metadata.

EXAMPLE #2

Assuming following combination (synchronous and asynchronous) of PPRC relations: $A_0 \text{-->} B_1$, $A_0 \text{--->} B_2$, ... $A_0 \text{-->} B_M$. One OOS bitmap may be defined in memory for every PPRC relation, one ORed OOS bitmap may be defined for the synchronous PPRC relations in the metadata, and one ORed OOS bitmap may be defined for asynchronous PPRC relations in metadata.

It is noteworthy that any other combination of relations can be supported and the combinations may be the existing OOS bitmaps. Advantageously, the response time to the host for each write is minimized. That is, instead of returning and acknowledgment to the host after accessing and updating the metadata of all the OOS bitmaps, the acknowledgment is returned to the host after accessing and updating one OOS bitmap metadata. Such implementation improves the response time for the host and will reduce the number of metadata tracks that are hardened to the disk.

In case of a bad path event (i.e., following an error handling behavior (EHB) such as a machine crash, a warmstart, etc.), the OOS bitmap may be recovered from metadata and replicated to the established PPRC relations with OOS bitmaps ORed in the metadata. This may cause sending data to secondary volumes which was already sent before the EHB occurred. However, for synchronous PPRC relations, no data is to be transferred and the OOS bitmap of this relation may be ignored.

The following exemplary algorithms may be utilized to accomplish the procedures discussed above.

Good Path:
1. For each write (for asynchronous PPRC relations and suspended PPRC relations) set a bit in the corresponding OOS bitmap in the memory.
2. For each track which was copied successfully to the secondary (for asynchronous PPRC relations and suspended PPRC relations) reset a bit in the corresponding OOS bitmap in the memory.
3. After each update to the OOS bitmaps in the memory (performed desirably atomically with 1 or 2 above), if there are "n" OOS bitmaps in Cache (OOS1, ..., OOSn) then the metadata OOS bitmap is the logical OR of all the n OOS bitmaps:
New Metadata OOS Bitmap=(Metadata OOS Bitmap) OR (OOS1) OR ... OR (OOSn)

In some implementations, a subset (or several subsets) M of the existing OOS bitmaps in cache and the metadata OOS bitmap is the logical OR of the M OOS bitmaps.

Bad Path (EHB):
1. After an EHB event, the metadata OOS Bitmap is recovered, when proper.
2. The Metadata OOS bitmap is replicated into in-memory OOS bitmaps and saved in Cache for the PPRC relations with the OOS bitmap that was ORed in the recovered metadata.
3. Copy the registered data in each OOS bitmap in-memory to the PPRC secondary storage volumes.

It is noteworthy that in bad path events (e.g., following a machine crash or a warm start) the OOS bitmap may be recovered from metadata and replicated to the established PPRC relations with OOS bitmaps ORed in the metadata. As a result, duplicate data may be sent to secondary volumes if the same data was already sent prior to the EHB occurring. For synchronous PPRC relations, where there is no data lag between data copied to the primary and the secondary, no data is transferred and the OOS bitmap in this relation may be ignored.

In certain embodiments, each PPRC relation may maintain an additional fixed size bitmap in memory and in metadata. Each bit in the bitmap may represent a portion of tracks in the PPRC pair's in memory OOS bitmap. For example, if the bitmap size is 64 bits, then the first bit in the bitmap represents tracks [0, (volume size/64)−1], the second bit represents tracks [(volume size/64), 2*(volume size/64)−1], and so on. In an exemplary embodiment, a bit is set when the first bit in the corresponding portion is set and the bit is reset when the bits in the respective range are set to zero.

During EHB recovery, each portion of the OOS bitmap that is stored in memory may be recovered from the OOS metadata bitmap, if a corresponding bit is set in the additional fixed size bitmap in metadata, otherwise the OOS portion is set to zero. Accordingly, the number of OOS bits set in the in memory bitmap are reduced following an EHB event, and as a result the amount of data sent to secondary PPRC volume is reduced.

In different embodiments, the invention can be implemented either entirely in the form of hardware or entirely in the form of software, or a combination of both hardware and software elements. For example, computing systems 110 and host 114 may comprise a controlled computing system environment that can be presented largely in terms of hardware components and software code executed to perform processes that achieve the results contemplated by the system of the present invention.

Figure 4:
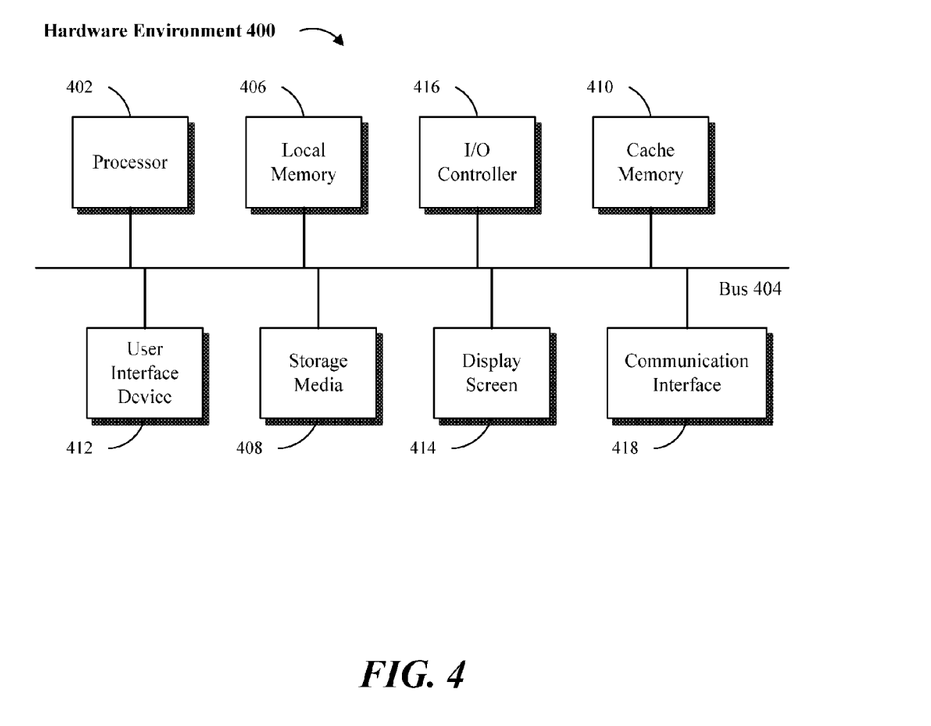
FIGS. 4 and 5 are block diagrams of hardware and software environments in which a system of the present invention may operate, in accordance with one or more embodiments.
Figure 5:
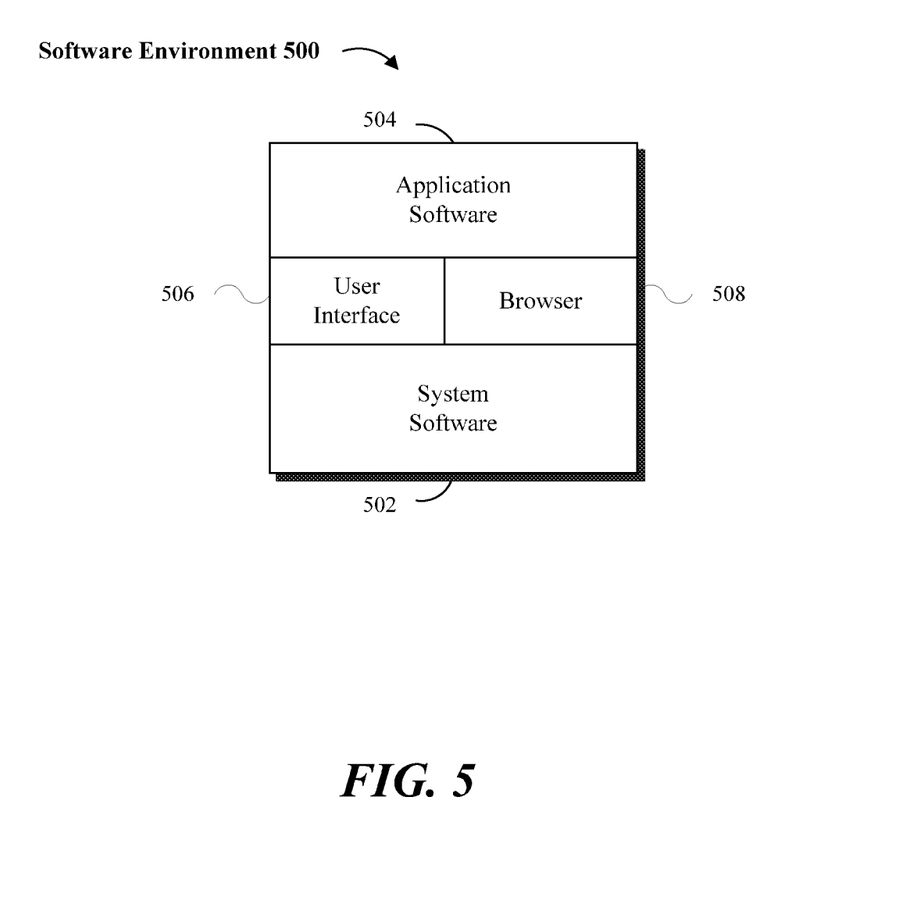

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, host 114 may be implemented as system software 502 or application software 504 executed on one or more hardware environments. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for synchronizing data stored on primary and secondary storage volumes in a distributed data recovery system, the method comprising:

associating N data recovery relationships between a primary volume and N secondary volumes by way of implementing N data structures respectively, wherein the N data structures are bitmaps, monitoring a plurality of indicators for a respective track in each one of the N data structures, wherein each data structure comprises a first indicator that indicates whether data stored on a first track of the primary volume has been updated, due to a first operation performed by a host application, and wherein one or more of the N data structures are stored in at least a first data storage medium with high speed data access rates;

implementing a primary data structure comprising a second indicator for monitoring and indicating that data stored on the first track of the primary volume has been updated, in response to detecting that the first indicator in at least one of the N data structures is set to a first value, wherein the primary data structure is a bitmap, wherein each bit in a primary bitmap on the primary data structure is uniquely associated with a respective bit in a secondary bitmap on each of a secondary data structure, and further with a corresponding track on a primary volume, wherein the N data structures includes the secondary data structure, wherein a first bit in the secondary bitmap of the secondary data structure is set when a first track on the primary volume associated with the first bit is updated, and wherein the first bit in at least one secondary data structure is reset when a corresponding track in a respective secondary volume is successfully updated;

resetting the plurality of indicators in the primary data structure when resetting the plurality of indicators in the secondary data structure, wherein during a state of reset:
   providing, via an evaluation, an indication that no tracks on the primary volume are to be copied to the secondary volume;
staging and destaging a single primary bitmap rather than storing and reading N secondary bitmaps for reducing a response time to a host;
entering a suspended state for marking write operations in the primary bitmap on the primary data structure upon a break in communication between the primary volume and one of the N secondary volumes, wherein corresponding data which has been set in the primary bitmap on the primary data structure is copied to the secondary bitmap on each of the secondary data structure; and
providing an acknowledgment to the host that at least one of the N data structures reflects the updated status of the data stored in the first track of the primary volume, so that the host continues to perform a second operation without waiting for synchronization between the primary volume and the respective secondary volume to be completed.

2. The method of claim 1 further comprising updating the value of the second indicator in the primary data structure to indicate that data stored on the first track of the primary volume has been successfully copied to M secondary volumes, in response to detecting that the first indicator in at least M of the N data structures is set to a second value.

3. The method of claim 1, wherein the primary data structure is stored on at least one non-volatile data storage medium.

4. The method of claim 1, wherein the first data storage medium comprises at least one of random access memory, flash memory, or a solid state memory device.

5. The method of claim 3, wherein the non-volatile data storage medium comprises at least one of a hard disk drive, a CD ROM, or a solid state memory device.

6. The method of claim 1, wherein the primary volume is locally coupled to a computing system over which the host application is executed.

7. The method of claim 1, wherein one or more of the N secondary volumes are remotely coupled to a computing system over which the host application is executed.

8. The method of claim 1, wherein the first bit in at least one secondary data structure is reset when a corresponding track in the respective secondary volume is successfully updated.

9. The method of claim 8, wherein value of each bit in the primary data structure is determined based on the value of one or more corresponding bits in the N data structures.

10. The method of claim 8, wherein the value of a first bit in the primary data structure is equal to the value of a plurality of first bits in M data structures out of the N data structures added together by way of a logical OR operation.

11. A system for synchronizing data stored on primary and secondary storage volumes in a distributed data recovery system, the system comprising:
   a processor device operable in the distributed data recovery system,
   a logic unit in communication with the processor device to associate N data recovery relationships between a primary volume and N secondary volumes by way of implementing N data structures respectively, wherein the N data structures are bitmaps,
   monitoring a plurality of indicators for a respective track in each one of the N data structures,
   wherein each data structure comprises a first indicator that indicates whether data stored on a first track of the primary volume has been updated, due to a first operation performed by a host application, and
   wherein one or more of the N data structures are stored in at least a first data storage medium with high speed data access rates;
   a logic unit in communication with the processor device to implement a primary data structure comprising a second indicator for monitoring and indicating that data stored on the first track of the primary volume has been updated, in response to detecting that the first indicator in at least one of the N data structures is set to a first value, wherein the primary data structure is a bitmap,
   wherein each bit in a primary bitmap on the primary data structure is uniquely associated with a respective bit in a secondary bitmap on each of a secondary data structure, and further with a corresponding track on a primary volume, wherein the N data structures includes the secondary data structure,
   wherein a first bit in the secondary bitmap of the secondary data structure is set when a first track on the primary volume associated with the first bit is updated, and
   wherein the first bit in at least one secondary data structure is reset when a corresponding track in the respective secondary volume is successfully updated;
   resetting the plurality of indicators in the primary data structure when resetting the plurality of indicators in the secondary data structure, wherein during a state of reset:
      providing, via an evaluation, an indication that no tracks on the primary volume are to be copied to the secondary volume;
   staging and destaging a single primary bitmap rather than storing and reading N secondary bitmaps for reducing a response time to a host;
   entering a suspended state for marking write operations in the primary bitmap on the primary data structure upon a break in communication between the primary volume and one of the N secondary volumes, wherein corresponding data which has been set in the primary bitmap on the primary data structure is copied to the secondary bitmap on each of the secondary data structure; and
   a logic unit in communication with the processor device to provide an acknowledgment to the host that at least one of the N data structures reflects the updated status of the data stored in the first track of the primary volume, so that the host continues to perform a second operation without waiting for synchronization between the primary volume and the respective secondary volume to be completed.

12. The system of claim 11 further comprising a logic unit in communication with the processor device to update the value of the second indicator in the primary data structure to indicate that data stored on the first track of the primary volume has been successfully copied to M secondary volumes, in response to detecting that the first indicator in at least M of the N data structures is set to a second value.

13. The system of claim 11, wherein the primary data structure is stored on at least one non-volatile data storage medium.

14. The system of claim 11, wherein the first data storage medium comprises at least one of random access memory, flash memory, or a solid state memory device.

15. The system of claim 13, wherein the non-volatile data storage medium comprises at least one of a hard disk drive, a CD ROM, or a solid state memory device.

16. A computer program product comprising a computer useable medium storing a non-transitory computer readable program, wherein the non-transitory computer readable program when executed on a computer causes the computer to:
- associate N data recovery relationships between a primary volume and N secondary volumes by way of implementing N data structures respectively, wherein the N data structures are bitmaps,
- monitoring a plurality of indicators for a respective track in each one of the N data structures,
  - wherein each data structure comprises a first indicator that indicates whether data stored on a first track of the primary volume has been updated, due to a first operation performed by a host application, and
  - wherein one or more of the N data structures are stored in at least a first data storage medium with high speed data access rates;
- implement a primary data structure comprising a second indicator for monitoring and indicating that data stored on the first track of the primary volume has been updated, in response to detecting that the first indicator in at least one of the N data structures is set to a first value, wherein the primary data structure is a bitmap,
  - wherein each bit in a primary bitmap on the primary data structure is uniquely associated with a respective bit in a secondary bitmap on each of a secondary data structure, and further with a corresponding track on a primary volume, wherein the N data structures includes the secondary data structure,
  - wherein a first bit in the secondary bitmap of the secondary data structure is set when a first track on the primary volume associated with the first bit is updated, and
  - wherein the first bit in at least one secondary data structure is reset when a corresponding track in the respective secondary volume is successfully updated;
- resetting the plurality of indicators in the primary data structure when resetting the plurality of indicators in the secondary data structure, wherein during a state of reset:
  - providing, via an evaluation, an indication that no tracks on the primary volume are to be copied to the secondary volume;
- staging and destaging a single primary bitmap rather than storing and reading N secondary bitmaps for reducing a response time to a host;
- entering a suspended state for marking write operations in the primary bitmap on the primary data structure upon a break in communication between the primary volume and one of the N secondary volumes, wherein corresponding data which has been set in the primary bitmap on the primary data structure is copied to the secondary bitmap on each of the secondary data structure; and
- provide an acknowledgment to the host that at least one of the N data structures reflects the updated status of the data stored in the first track of the primary volume, so that the host continues to perform a second operation without waiting for synchronization between the primary volume and the respective secondary volume to be completed.

17. The computer program product of claim 16, wherein the non-transitory
- computer readable program when executed on a computer further causes the computer to update the value of the second indicator in the primary data structure to indicate that data stored on the first track of the primary volume has been successfully copied to M secondary volumes, in response to detecting that the first indicator in at least M of the N data structures is set to a second value.

18. The system of claim 11, wherein the first bit in at least one of the secondary data structure is reset when a corresponding track in the respective secondary volume is successfully updated.

19. The system of claim 11, wherein value of each bit in the primary data structure is determined based on the value of one or more corresponding bits in the N data structures.

20. The system of claim 11, wherein the value of a first bit in the primary data structure is equal to the value of a plurality of first bits in M data structures out of the N data structures added together by way of a logical OR operation.

* * * * *